United States Patent [19]

Kaida et al.

[11] 3,832,681

[45] Aug. 27, 1974

[54] PRESSURE CHANGE DETECTING SYSTEM FOR ROTATING BODY

[75] Inventors: Masaaki Kaida; Shigeo Yasuda, both of Tokyo, Japan

[73] Assignees: Bridgestone Tire Company Limited; Mitaka Instrument Company Limited, both of Tokyo, Japan

[22] Filed: May 4, 1973

[21] Appl. No.: 357,514

[30] Foreign Application Priority Data

May 13, 1972   Japan.......................... 47-47326

[52] U.S. Cl.................. 340/58, 73/146.5, 116/34 R
[51] Int. Cl. ........................................... B60c 23/04
[58] Field of Search .....................................
   73/146.2–146.5; 340/58; 116/34 R

[56] References Cited
UNITED STATES PATENTS 3,781,787   12/1973   Sugiyama.............................. 340/58

*Primary Examiner*—Donald O. Woodiel
*Attorney, Agent, or Firm*—Waters, Roditi, Schwartz & Nissen

[57] ABSTRACT

A pressure change detecting system for detecting change of pressure of pressurized gas confined in a chamber of a rotating body, which comprises a detector adapted to be mounted on the rotating body and including a magnet carrier plate carrying thereon a permanent magnet and a weight member, the magnet carrier plate being rotatable in accordance with centrifugal force applied to the weight member due to the rotation of the rotating body, and lock means for allowing the magnet carrier plate together with the magnet to upset only when the pressure of the pressurized gas changes over a predetermined extent, an electromotive element so positioned as to face the orbital plane of the detector for producing an electro-motive force in accordance with variation of a magnetic field established therein due to the rotation of the detecting assembly, and processor for processing the electromotive force so as to produce pressure change information signal in accordance with the electro-motive force.

7 Claims, 7 Drawing Figures

PATENTED AUG 27 1974

3,832,681

PRESSURE CHANGE DETECTING SYSTEM FOR ROTATING BODY

The present invention relates to a detecting system for detecting change of pressure of a pressurized gas in a rotating body and, more particularly, to a detecting system for detecting and alarming change of a pressurized gas confined in a chamber of a rotating body such as a tubeless tire installed on a wheel of a motor vehicle.

Heretofore, various detecting systems for detecting change of a pressurized gas confined in a rotating body have been developed, one of which is a detecting system including a permanent magnet adapted to be reciprocally movable or rotatable, an actuator such as Bourdon tube or diaphragm for actuating the permanent magnet, and a reed switch which operates in response to change of a magnetic flux formed therein by the permanent magnet so as to energize an alarm circuit. Another detecting system includes a mechanical switch mounted on a rotating body containing therein a pressurized gas to be detected, an actuator with a coil spring or a piston for actuating the switch, and a detector electrically connected through a slip ring or an antenna to the switch for detecting the closure or opening of the switch.

Since, however, the above-stated conventional systems all detect the change of pressure through the operation of a mechanical switch or contacts, these systems are subject to erroneous operation due to minimal fluctuations of pressure of the gas or shocks and vibrations applied to the detecting system. Especially, the latter system employing the slip ring or antenna is inevitably complicated in construction and accordingly costly.

It is therefore a primary object of the present invention to provide a new and improved pressure change detecting system for detecting change of pressure of a pressurized gas confined in a chamber of a rotating body.

It is another object of the present invention to provide a pressure change detecting system for a rotating body which is reliable in operation.

It is a further object of the present invention to provide a pressure change detecting system which is simple in construction and accordingly economical.

According to the present invention, the above objects are achieved by a pressure change detecting system which comprises a detecting assembly including a housing adapted to be mounted on a rotating body containing therein a pressurized gas, magnet carrier plate carrying thereon a permanent magnet and a weight member and accommodated in the housing in such a manner as to be rotated by centrifugal force applied to the weight member due to the rotation of the rotating body, and lock means for locking the magnet carrier plate at a rest position when the pressure of the pressurized gas is maintained and for allowing the magnet carrier plate to rotate from the rest position thereby to cause the magnet to upset when the pressure of the pressurized gas changes over a predetermined extent, an electro-motive element fixedly so positioned as to face the orbital plane of the detecting assembly for producing an electro-motive force in accordance with variation of a magnetic field established therein due to the rotation of the detecting assembly, and process means for processing the electro-motive force and for producing pressure change information signal in accordance with the electro-motive force.

A preferred embodiment of the pressure change detecting system according to the present invention is illustrated in the accompanying drawings in which.

Figure 1:
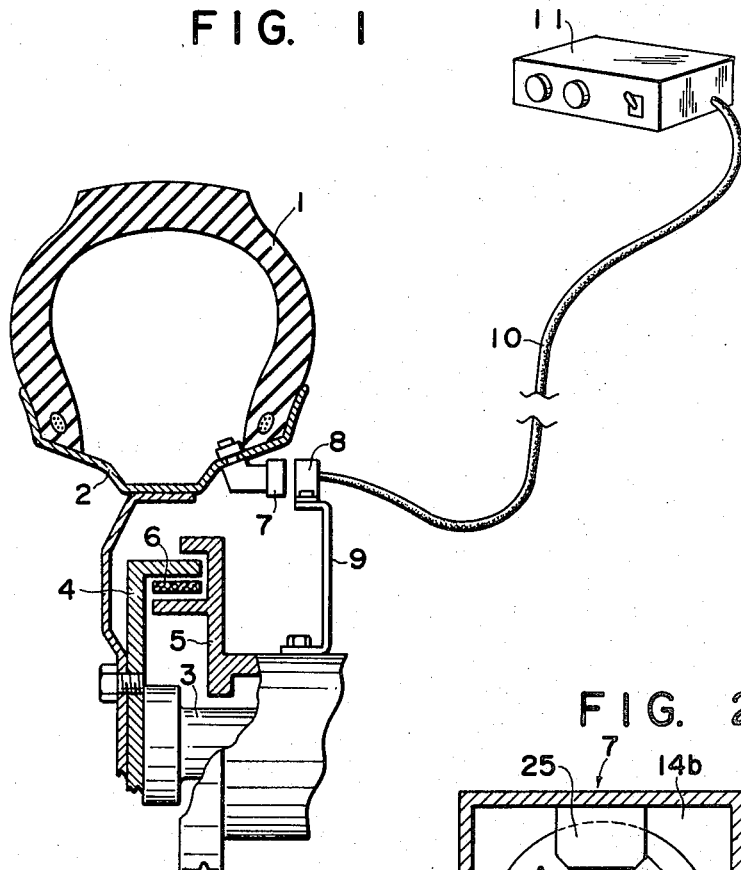
FIG. 1 is a schematic view of a pressure change detecting system of the present invention which is installed on a wheel of a motor vehicle.

Referring now to the drawings and in particular to FIG. 1 thereof, there is shown a pressure change detecting system according to the invention, which is now applied to a tubeless tire 1 mounted on a rim 2 for a tubeless tire. The rim 2 is firmly fixed on an end portion 4 of a wheel shaft 3. A brake drum 5 is coupled with the end portion 4 by way of a brake shoe 6. The detecting system comprises a detecting assembly 7 which is mounted on the rim 2 and accordingly rotates about the axis of the wheel shaft 3 when the wheel rotates. The detecting assembly 7 have a portion communicated with the chamber defined by the tubeless tire 1 and detects the change of pressure of the pressurized air in the chamber. As shown in this figure, the main portion of the detecting assembly 7 is formed to extend in parallel with the rotation axis of the shaft 3. The detecting system includes an electro-motive element 8 which is mounted on a bracket 9 fixed on the brake drum 5 so as to face the orbital plane of the detecting assembly 7. The electromotive element 8 is electrically connected by way of a cord 10 to an electric controller 11.

Figure 2A:
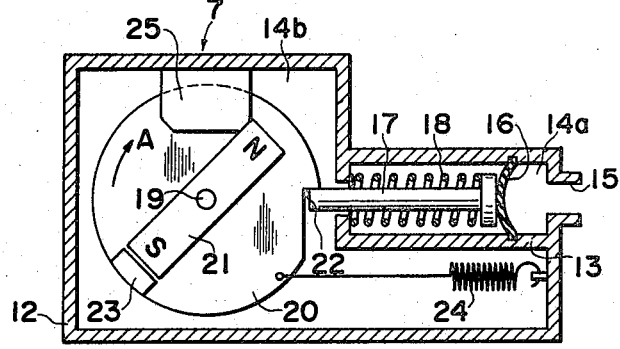
FIGS. 2A and 2B are sectional views of a part of the detecting system of the invention, which is to be mounted on a rotating body with a chamber containing a pressurized gas.
Figure 2B:
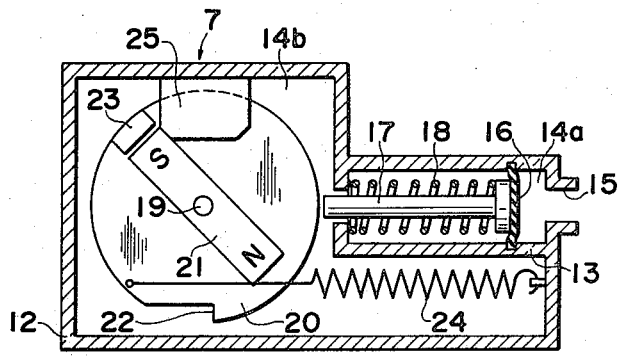

FIGS. 2A and 2B illustrate in more detail the detecting assembly 7 which includes a housing 12 adapted to be mounted on the rim 2 and having two chambers 14a and 14b separated from each other by an intermediate wall 13. The chamber 14a is divided by a diaphragm 16 into two compartments one of which is adapted to communicate by way of a passageway 15 with the chamber in the tubeless tire 1. A piston rod 17 is reciprocally slidably accommodated in the other compartment. The piston rod 17 has at one end an enlarged portion and urged by a coil spring 18 so that the enlarged end presses the diaphragm 16 against the pressure of the gas supplied to the compartment by way of the passageway 15. A rotation shaft 19 is fixed on the inner wall of the housing 12 in such a manner as to extend in the chamber 14b perpendicularly to the piston rod 17. A magnet carrier plate 20 is rotatably mounted on the rotation shaft 19 and carries on the major surface thereof a permanent magnet 21. The magnet carrier plate 20 has at its edge portion a gain 22 which engages with the remaining end of the piston rod 17 when the piston rod 17 is in the leftmost position. A weight member 23 is mounted on the magnet carrier plate in the vicinity of one of the poles N and S of the magnet 21. A spring 24 is preferably provided which has one end connected to the inner wall of the housing 12 and the other end connected to an edge portion of the magnet carrier plate 20 so as to urge the plate 20 to the opposite direction to a direction as indicated by an arrow A until the magnet 21 abuts onto stop member 25 fastened to the inner wall of the housing 12. It is necessary to mount the housing 12 on the rim 2 so that the magnet carrier plate 21 is urged to the direction A by the centrifugal force applied to the weight member 23 due to the rotation of the rim 2.

Before, with the above-stated arrangement, the rim 2 commences to rotate, the magnet carrier plate 20 is positioned at a rest position by means of the spring 24 as shown in FIG. 2A. When, in this instance, the pressure of the pressurized gas in the tubeless tire 1 is maintained at a predetermined value, the diaphragm 16 is forced to press the piston rod 17 against the spring force of the spring 18 so that the end of the piston rod 17 engages with the magnet carrier plate 20 through the gain 22 whereby the magnet carrier plate 20 is locked at the rest position. As long as the pressure of the gas in the tire 1 is maintained, the magnet carrier plate together with the magnet 21 is forced to be in the rest position even if the weight member 23 is subjected to the centrifugal force due to the rotation of the rim 2 and the tubeless tire 1.

When the pressure of the pressurized air in the tubeless tire 1 happens to reduce because of a certain trouble, the piston rod 17 is moved toward the diaphragm member 16 due to the spring force of the spring 18 until the end thereof disengages from the magnet carrier plate 20 whereby the magnet carrier plate 20 is forced to rotate against the spring force of the spring 24 by the centrifugal force applied to the weight member 23 due to the rotation of the assembly 7 thereby to cause the magnet 21 upsets as shown in FIG. 2B.

Figure 3:
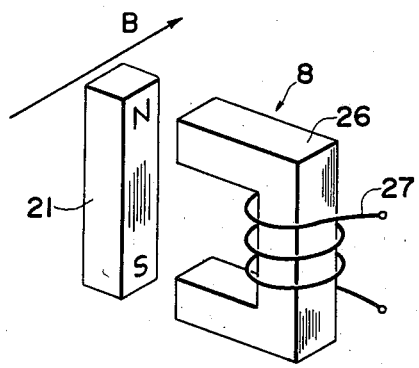
FIG. 3 is a schematic view diagramatically illustrating positional relationship between a magnet element and an electromotive element of the detecting system as long as the pressure of the gas contained in the rotating body is maintained.
Figure 4:
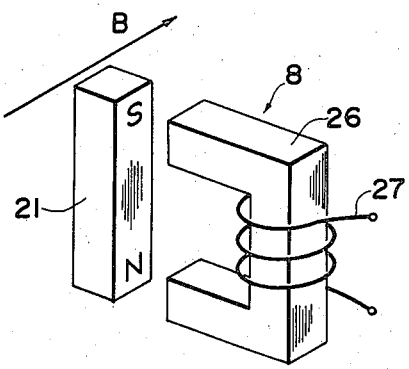
FIG. 4 is a schematic view diagramatically illustrating positional relationship between the magnet element and the electromotive element after the change of the pressure takes place.
Figure 5:
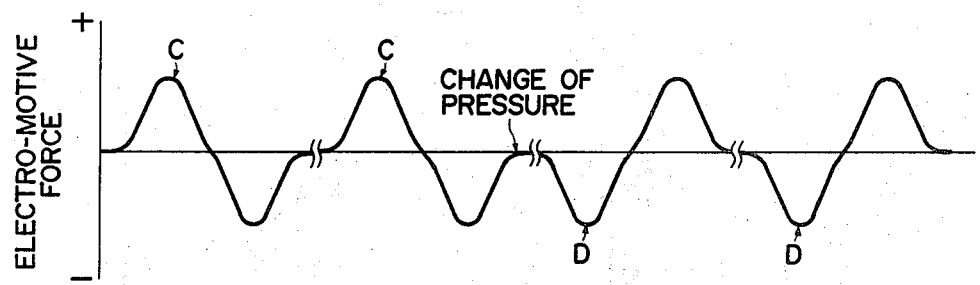
FIG. 5 is a diagram showing waveforms of electromotive force generated in the electromotive lement.

Referring now to FIGS. 3, 4 and 5, the operation of the electro-motive element 8 is explained hereinbelow.

The electro-motive element 8, in this case, includes a U-shaped magnetic path member 26 and a coil 27 surrounding the bottom portion of the member 26. The U-shaped magnetic path member 26 is so formed and positioned that the both terminal ends thereof respectively confront both the poles N and S of the magnet 21 when the detecting assembly 7 passes in the vicinity of the element 8 in such a direction as indicated by an arrow B in FIGS. 3 and 4.

When the pressure of the pressurized air in the tire 1 is maintained, the magnet carrier plate 20 as well as the magnet 21 are at the rest position as described hereinbefore in reference to FIG. 2A, so that the electro-motive element 8 confronts the magnet 21 in such a manner as illustrated in FIG. 3. Since the magnet 21 repeatedly passes in front of the electro-motive element 8 because of the rotation of the rim 2, an electric signal repeatedly appear across the terminals of the coil 27, which has a waveform C as shown in FIG. 5.

When the pressure of the pressurized air in the tire 1 changes due to a certain trouble, the magnet 21 upsets as above-described, so that the electro-motive element 8 confronts the magnet 21 in such a manner as illustrated in FIG. 4 when the assembly 7 passes in the vicinity of the element 8. Accordingly, an electric signal repeatedly appears across the two terminals of the coil 27, which signal has a waveform as indicated by C in FIG. 5. It should be now noted that the waveforms C and D are inverted in phase from each other.

Figure 6:
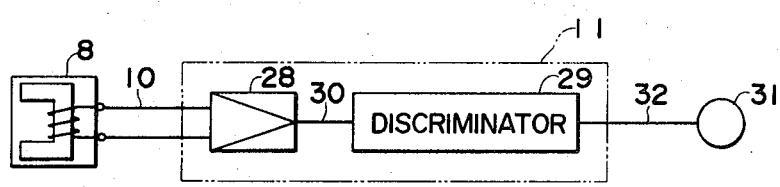
FIG. 6 is a block diagram of an electric controller of the detecting system of the invention.

The electric controller 11 therefore includes a circuit arrangement for detecting such phase-inversion of the electric signal generated by the element 8 as abovestated in connection with FIG. 5. FIG. 6 illustrates the circuit arrangement which comprises an amplifier 28 connected through the cord 10 to the output terminals of the electro-motive element 8, and a discriminator 29 connected through a line 30 to the amplifier 28 for producing a pressure change information signal when it receives from the amplifier 28 an electric signal having a waveform D shown in FIG. 5. The circuit arrangement preferably includes an alarm 31 connected through a line 32 to the discriminator 29 for alarming in response to the pressure change information signal.

It should be now appreciated that although the gain 22 is formed in an edge portion of the magnet carrier plate 20, the gain 22 may be formed on the periphery of the rotation shaft 19. Further, a bore may be formed in the magnet carrier plate 20 instead of the gain 22 and the piston rod and other elements are so assembled that the end of the piston rod is inserted into the bore. Furthermore, the stop member 25 may be omitted, if desired. The spring 24 may also omitted if preferred.

It is apparent from the above-description that the pressure change detecting system according to the invention can correctly operate in spite of shocks and vibrations applied thereto and fluctuations of the pressure of the pressurized gas. Furthermore, the system of the invention is simple in construction and accordingly economical and reliable in operation.

It will be understood that various changes in the details, materials, and elements, which have been herein described and illustrated in order to explain the nature of the invention, may be made by those skilled in the art, within the principle and scope of the invention as expressed in the appended claims.

What is claimed is:

1. A pressure change detecting system for detecting change of pressure of pressurized gas confined in a chamber of a rotating body, which comprises:

a detecting assembly including a housing adapted to be mounted on said rotating body, a magnet carrier plate carrying thereon a permanent magnet and a weight member and accommodated in said housing in such a manner as to be rotated by centrifugal force applied to said weight member due to the rotation of the rotating body, and lock means connected with said housing for locking said magnet carrier plate at a rest position when the pressure of the pressurized gas is maintained and for allowing said magnet carrier plate to rotate from said rest position thereby to cause said magnet to upset when the pressure of the pressurized gas changes over a predetermined extent;

an electro-motive element fixedly so positioned as to face the orbital plane of said detecting assembly for producing an electro-motive force in accordance with variation of a magnetic field established therein due to the rotation of said detecting assembly; and process means for processing said electro-motive force and for producing pressure change information signal in accordance with said electro-motive force.

2. A pressure change detecting system as set forth in claim 1, in which said magnet carrier plate is a generally circular plate.

3. A pressure change detecting system as set forth in claim 1, in which said detecting assembly further includes limit means for limiting the rotation angle of said magnet carrier plate to a predetermined extent.

4. A pressure change detecting system as set forth in claim 1, in which said lock means includes a cylinder having therein a chamber and being integral with said housing, a diaphragm member dividing said chamber of said cylinder into two compartments one of which is adapted to communicate with said chamber of the rotating body, a piston rod reciprocally slidably accommodated in the other compartment and having one end portion inserted into an opening formed in the wall of said cylinder and having the other end abutting onto said diaphragm, and a resilient member accommodated in the other compartment for urging said piston rod toward said diaphragm so that said one end of said piston rod engages with said magnet carrier plate when the pressure of the pressurized gas in the rotating body is maintained and disengages from said magnet carrier plate when the pressure of the gas changes over the predetermined extent.

5. A pressure change detecting system as set forth in claim 1, in which said detecting assembly further includes a resilient member having one end connected to the inner wall of said housing and the other end connected to a point of said magnet carrier plate so as to urge said magnet carrier plate to said rest position.

6. A pressure change detecting system as set forth in claim 1, which further comprises an alarm circuit for alarming in response to said pressure change information signal from said process means.

7. A pressure change detecting system as set forth in claim 1, in which said electro-motive element includes a U-shaped magnet path member made of a magnetic substance and so positioned that both the terminal ends thereof respectively confront the pole portions of said magnet of the detecting assembly when said detecting assembly passes in the vicinity of said electro-motive element, and a coil surrounding the bottom portion of said U-shaped magnetic path member, whereby said electro-motive force appears across two terminals of said coil when said detecting assembly passes in the vicinity of said electro-motive element.

* * * * *